US 9,285,492 B2

(12) United States Patent
Ma et al.

(10) Patent No.: US 9,285,492 B2
(45) Date of Patent: Mar. 15, 2016

(54) IDENTIFYING FRACTURE PLANES FROM MICROSEISMIC DATA

(71) Applicant: HALLIBURTON ENERGY SERVICES, INC., Houston, TX (US)

(72) Inventors: Jianfu Ma, Sugar Land, TX (US); Avi Lin, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 357 days.

(21) Appl. No.: 13/896,617

(22) Filed: May 17, 2013

(65) Prior Publication Data
US 2014/0098638 A1    Apr. 10, 2014

Related U.S. Application Data

(60) Provisional application No. 61/710,582, filed on Oct. 5, 2012.

(51) Int. Cl.
*G01V 1/00* (2006.01)
*G01V 1/28* (2006.01)
*G01V 1/40* (2006.01)
(Continued)

(52) U.S. Cl.
CPC ............... *G01V 1/288* (2013.01); *G01V 1/301* (2013.01); *G01V 1/34* (2013.01); *G01V 1/345* (2013.01); *G01V 1/40* (2013.01); *G01V 2210/1234* (2013.01); *G01V 2210/646* (2013.01)

(58) Field of Classification Search
CPC . G01V 1/288; G01V 1/40; G01V 2210/1234; G01V 2210/646

USPC .......................................................... 367/38
See application file for complete search history.

(56) References Cited

U.S. PATENT DOCUMENTS

| 5,497,722 A | 3/1996 | English, Sr. |
| 7,103,219 B2 | 9/2006 | Cahill |
| 7,783,127 B1 | 8/2010 | Wilensky |

(Continued)

FOREIGN PATENT DOCUMENTS

| WO | WO 2008/107859 | 9/2008 |
| WO | WO 2011/077227 | 6/2011 |

(Continued)

OTHER PUBLICATIONS

Williams et al., "Quantitative Interpretation of Major Planes from Microseismic Events Locations With Application in Production Prediction", SEG 2010-2085, 2010 SEG Annual Meeting, Oct., Denver, Colorado, 5 pages.

(Continued)

*Primary Examiner* — Mark Hellner
(74) *Attorney, Agent, or Firm* — Holly Soehnge; Fish & Richardson P.C.

(57) ABSTRACT

Systems, methods, and software can be used to identify fracture planes in a subterranean zone. In some aspects, data representing locations of microseismic events associated with a subterranean zone are received. Fracture plane parameters are calculated from the locations of the microseismic events. The fracture plane parameters are calculated based on a sum of weighted terms, and each of the weighted terms includes a weighting factor that decreases with a distance between at least one of the microseismic events and a fracture plane defined by the fracture plane parameters.

28 Claims, 5 Drawing Sheets

(51) Int. Cl.
*G01V 1/34* (2006.01)
*G01V 1/30* (2006.01)

(56) References Cited

U.S. PATENT DOCUMENTS

| | | |
|---|---|---|
| 8,386,226 B2 | 2/2013 | Craig |
| 8,392,165 B2 | 3/2013 | Craig et al. |
| 2007/0272407 A1* | 11/2007 | Lehman et al. ............ 166/250.1 |
| 2008/0004847 A1 | 1/2008 | Bradford |
| 2010/0307755 A1 | 12/2010 | Xu et al. |
| 2010/0312529 A1 | 12/2010 | Souche et al. |
| 2011/0029291 A1 | 2/2011 | Weng et al. |
| 2011/0029293 A1 | 2/2011 | Petty et al. |
| 2011/0067857 A1* | 3/2011 | Underhill et al. ........ 166/250.01 |
| 2011/0120702 A1 | 5/2011 | Craig |
| 2011/0120705 A1 | 5/2011 | Walters et al. |
| 2011/0120706 A1 | 5/2011 | Craig |
| 2011/0120718 A1 | 5/2011 | Craig |
| 2011/0213602 A1* | 9/2011 | Dasari et al. .................... 703/10 |

FOREIGN PATENT DOCUMENTS

| | | |
|---|---|---|
| WO | WO 2012/078128 | 6/2012 |
| WO | WO 2012/141720 | 10/2012 |

OTHER PUBLICATIONS

Authorized Officer Philip Bream, PCT International Search Report and Written Opinion of the International Searching Authority, PCT Application Serial No. PCT/US2013/057396, Dec. 20, 2013, 8 pages.

Mayerhofer et al., "Integrating Fracture Diagnostic Engineering Data in the Marcellus Shale," SPE 145463, 2011, SPE Annual Technical Conference and Exhibition, Oct. 30-Nov. 2, 2011, Denver, Colorado, 15 pages.

PCT International Preliminary Report on Patentability, PCT/US2013/057396, Apr. 16, 2015, 6 pages.

* cited by examiner

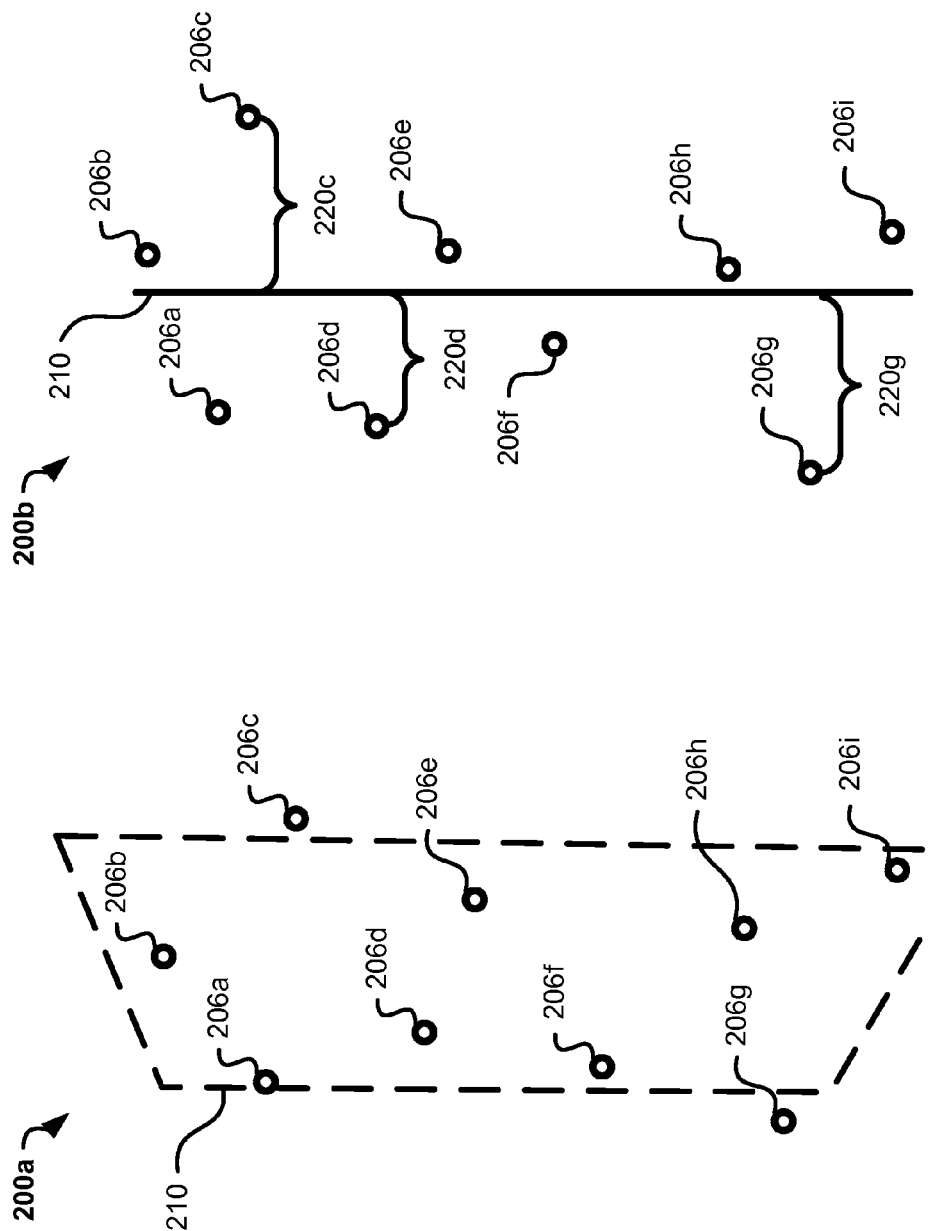

IDENTIFYING FRACTURE PLANES FROM MICROSEISMIC DATA

CROSS-REFERENCE TO RELATED APPLICATIONS

This application claims priority to U.S. Provisional Application Ser. No. 61/710,582, entitled "Identifying Dominant Fracture Orientations," filed on Oct. 5, 2012.

BACKGROUND

This specification relates to identifying fracture planes from microseismic data. Microseismic data are often acquired in association with hydraulic fracturing treatments applied to a subterranean formation. The hydraulic fracturing treatments are typically applied to induce artificial fractures in the subterranean formation, and to thereby enhance hydrocarbon productivity of the subterranean formation. The pressures generated by the fracture treatment can induce low-amplitude or low-energy seismic events in the subterranean formation, and the events can be detected by sensors and collected for analysis.

SUMMARY

In a general aspect, fracture planes are identified based on microseismic data from a subterranean zone.

In some aspects, data representing the locations of microseismic events associated with a subterranean zone are received. Fracture plane parameters are calculated from the locations of the microseismic events. The fracture plane parameters are calculated based on a sum of weighted terms, and each of the weighted terms includes a weighting factor that decreases with a distance between at least one of the microseismic events and a fracture plane defined by the fracture plane parameters.

Implementations may include one or more of the following features. Calculating the fracture plane parameters from the locations of the plurality of microseismic events includes calculating the fracture plane parameter from a location and uncertainty associated with each of the microseismic events. The plurality of microseismic events are selected based on combining multiple sets of microseismic events associated with previously-identified fracture planes. Each set was used to generate one of the previously-identified fracture planes.

Additionally or alternatively, these and other implementations may include one or more of the following features. Calculating the fracture plane parameter comprises minimizing the weighted sum with respect to the fracture plane parameter. Each of the terms in the weighted sum includes a weighting factor that does not increase with distance, and decreases linearly or nonlinearly with a distance between at least one of the microseismic events and a fracture plane defined by the fracture plane parameter.

Additionally or alternatively, these and other implementations may include one or more of the following features. Calculating the fracture plane parameter includes calculating at least one of the fracture plane parameters a, b, c, or d for the fracture plane defined by the equation $0 = ax + by + cz + d$. x, y, and z represent the coordinates of a three-dimensional rectilinear space. Calculating the fracture plane parameter includes selecting initial values of the fracture plane parameters a, b, c, and d. Calculating the fracture plane parameter includes constructing the coefficient factors and a system of equations $\{\partial S/\partial a = 0, \partial S/\partial b = 0, \partial S/\partial c = 0\}$, and an algebraic equation that relates the parameters, wherein S represents the weighted sum. Calculating the fracture plane parameter includes using possible initial values to solve the system of equations. For example, the initial values are computed based on a normal vector defined by three of the microseismic events, based on the average of several normal vectors defined several triples of the microseismic events, or based on any other appropriate techniques. For example, calculating the initial values includes generating a two dimensional natural histogram (e.g., in strike and dip angles); choosing a peak of the histogram that is closest to current orientation of the facture plane; and identifying the initial values based on the peak's corresponding orientation.

Additionally or alternatively, these and other implementations may include one or more of the following features. The weighted sum is represented as $S = \sum_{i=1}^{N} w_i f(h_i)$. Here, N represents the number of microseismic data points, $w_i$ represents the weighting factor for the $i^{th}$ term of the weighted sum, $h_i$ represents the distance of the $i^{th}$ microseismic event from the fracture plane, and $f(h_i)$ is a non-negative function of the distance $h_i$. For example, the function is represented as $f(h_i) = h_i^2$ and the distance is represented as $$h_i = \frac{ax_i + by_i + cz_i + d}{\sqrt{a^2 + b^2 + c^2}}$$

is the least square function for the normal distances. Here, $x_i$ represents the x coordinate of the $i^{th}$ microseismic event, $y_i$ represents the y coordinate of the $i^{th}$ microseismic event, $z_i$ represents the z coordinate of the $i^{th}$ microseismic event, and a, b, c, and d are the fracture plane parameters. The weighting factor for the $i^{th}$ term of the weighted sum can be represented as $w_i = e^{-h_i^2 \alpha_i}$, where $\alpha_i$ is a non-negative value less than one. The weighting factor for the $i^{th}$ term of the weighted sum can be represented as $w_i = (1 + \alpha_i h_i^2)^{-1}$. The weighting factor for the $i^{th}$ term of the weighted sum can be represented by a "witch" function $w_i = (\beta_i + \alpha_i h_i^2)^{-1}$, where each term includes constant values $\alpha_i$ and $\beta_i$, which may be manipulated or optimized in some instances.

Additionally or alternatively, these and other implementations may include one or more of the following features. The weighted sum $S = \sum_{i=1}^{N} w_i |h_i|$, wherein N represents the number of microseismic data points, $w_i$ represents the weighting factor for the $i^{th}$ term of the weighted sum, $h_i$ represents the distance of the $i^{th}$ microseismic event from the fracture plane, and $|h_i|$ represents the absolute value of the distance of the $i^{th}$ microseismic event from the fracture plane. The minimization solution is achieved using the improper partial derivatives.

The details of one or more implementations are set forth in the accompanying drawings and the description below. Other features, objects, and advantages will be apparent from the description and drawings, and from the claims.

DESCRIPTION OF DRAWINGS

FIGS. 2A and 2B are plots showing an example fracture plane identified from microseismic data.

Like reference symbols in the various drawings indicate like elements.

DETAILED DESCRIPTION

Figure 1A:
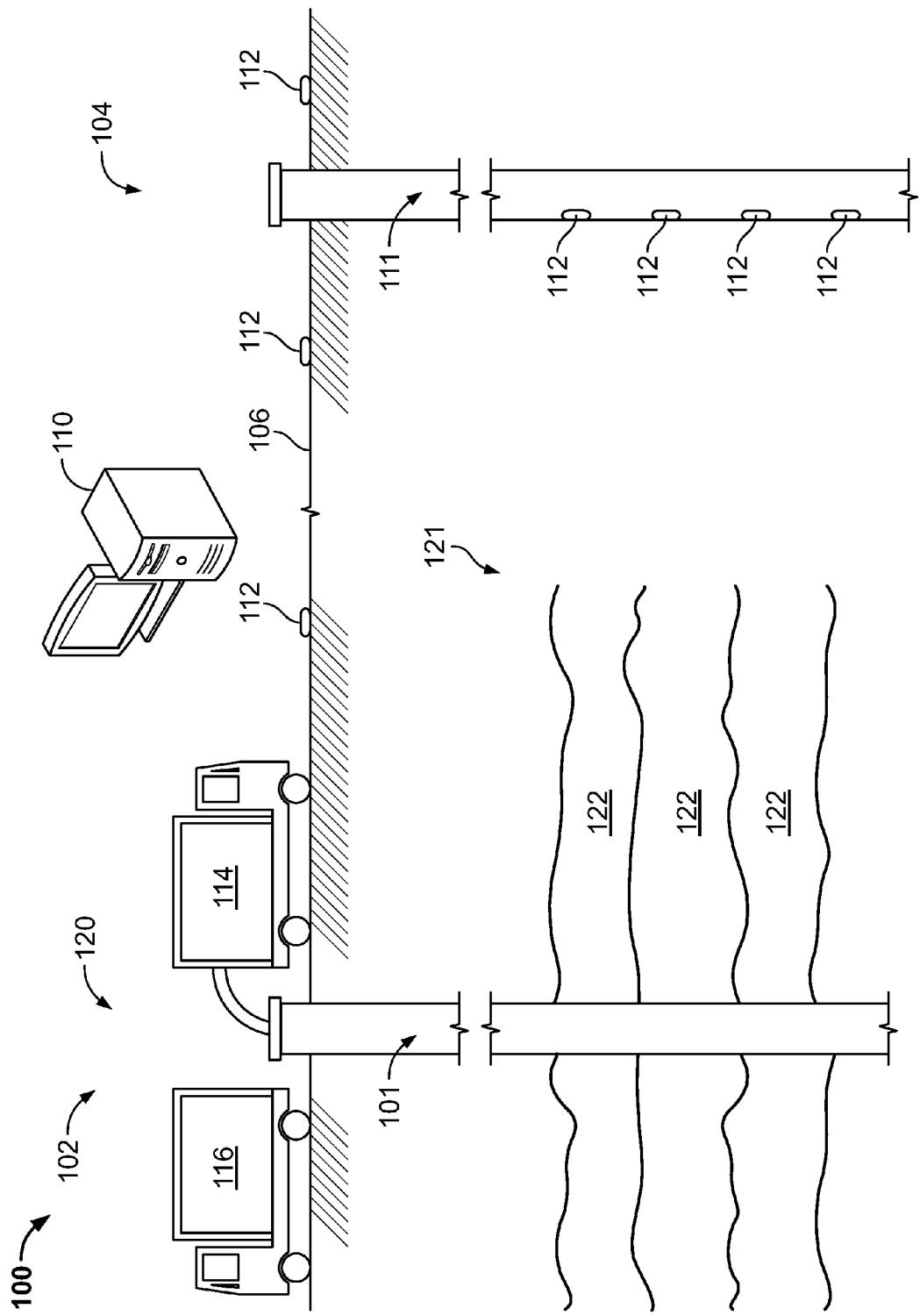
FIG. 1A is a diagram of an example well system.

In some aspects of what is described here, fracture planes are identified from microseismic events associated with a subterranean zone. In some cases, the fracture planes can be identified in real time while monitoring for microseismic data, and the fracture planes can be displayed to show time evolution, including propagation and growth of the fracture planes. Such capabilities can be incorporated into control systems, software, hardware, or other types of tools available to oil and gas field engineers when they are stimulating hydraulic fractures or perform any type of real-time analysis. In some cases, the fracture planes can be identified after the fracture treatment, and the fracture plane data can be used, for example, to plan or analyze production or other activities associated with the subterranean zone.

Hydraulic fracture treatments can be applied in any suitable subterranean zone. Hydraulic fracture treatments are often applied in tight formations with low-permeability reservoirs, which may include, for example, low-permeability conventional oil and gas reservoirs, continuous basin-centered resource plays and shale gas reservoirs, or other types of formations. Hydraulic fracturing can induce artificial fractures in the subsurface, which can enhance the hydrocarbon productivity of a reservoir.

During the application of a hydraulic fracture treatment, the injection of high-pressure fluids can alter stresses, accumulate shear stresses, and cause other effects within the geological subsurface structures. In some instances, microseismic events are associated with hydraulic fractures induced by the fracturing activities. The acoustic energy or sounds associated with rock stresses, deformations, and fracturing can be detected and collected by sensors. In some instances, microseismic events have low-energy (e.g., with the value of the log of the intensity or moment magnitude of less than three), and some uncertainty or accuracy or measurement error is associated with the event locations. The uncertainty can be described, for example, by a prolate spheroid, where the highest likelihood is at the spheroid center and the lowest likelihood is at the edge.

Microseismic event mapping can be used to geometrically locate the source point of the microseismic events based on the detected compressional and shear waves. The detected compressional and shear waves (e.g., p-waves and s-waves) can yield additional information about microseismic events, including the location of the source point, the event's location and position measurement uncertainty, the event's occurrence time, the event's moment magnitude, the direction of particle motion and energy emission spectrum, and possibly others. The microseismic events can be monitored in real time, and in some instances, the events are also processed in real time during the fracture treatment. In some instances, after the fracture treatment, the microseismic events collected from the treatment are processed together as "post data."

Processing microseismic event data collected from a fracture treatment can include fracture matching (also called fracture mapping). Fracture matching processes can identify fracture planes in any zone based on microseismic events collected from the zone. Some example computational algorithms for fracture matching utilize microseismic event data (e.g., an event's location, an event's location measurement uncertainty, an event's moment magnitude, etc.) to identify individual fractures that match the collected set of microseismic events. Some example computational algorithms can compute statistical properties of fracture patterns. The statistical properties may include, for example, fracture orientation, fracture orientation trends, fracture size (e.g., length, height, area, etc.), fracture density, fracture complexity, fracture network properties, etc. Some computational algorithms account for uncertainty in the events' location by using multiple realizations of the microseismic event locations. For example, alternative statistical realizations associated with Monte Carlo techniques can be used for a defined probability distribution on a spheroid or another type of distribution.

Generally, fracture matching algorithms can operate on real-time data, post data, post job data, or any suitable combination of these and other types of data. Some computational algorithms for fracture matching operate only on post data. Algorithms operating on post data can be used when any subset or several subsets of microseismic data to be processed has been collected from the fracture treatment; such algorithms can access (e.g., as an initial input) the full subset of microseismic events to be processed. In some implementations, fracture matching algorithms can operate on real-time data. Such algorithms may be used for real-time automatic fracture matching during the fracture treatment. Algorithms operating on real-time data can be used during the fracture treatment, and such algorithms can adapt or dynamically update a previously-identified fracture model to reflect newly-acquired microseismic events. For example, once a microseismic event is detected and collected from the treatment field, a real-time automatic fracture matching algorithm may respond to this new event by dynamically identifying and extracting fracture planes from the already-collected microseismic events in a real-time fashion. Some computational algorithms for fracture matching can operate on a combination of post data and real-time data.

In some cases, fracture mapping algorithms are configured to handle conditions that arise in real-time microseismic data processing. For example, several types of challenges or conditions may occur more predominantly in the real-time context. In some instances, real-time processing techniques can be adapted to account for (or to reduce or avoid) the lower accuracy that is sometimes associated with fractures extracted from data sets lacking a sufficient number of microseismic events or lacking a sufficient number of microseismic events in certain parts of the domain. Some real-time processing techniques can be adapted to produce fracture data that are consistent with the fracture data obtainable from post data processing techniques. For example, some of the example real-time processing techniques described here have produced results that are statistically the same, according to the statistical hypothesis test (t test and F test), as results produced by post data processing techniques on the same data.

In some cases, real-time processing techniques can be adapted to readily (e.g., instantaneously, from a user's perspective) offer the identified fracture data to users. Such features may allow field engineers or operators to dynamically obtain fracture geometric information and adjust fracture treatment parameters when appropriate (e.g. to improve, enhance, optimize, or otherwise change the treatment). In some instances, fracture planes are dynamically extracted from microseismic data and displayed to field engineers in real time. Real-time processing techniques can exhibit high-speed performance. In some cases, the performance can be enhanced by parallel computing technology, distributed computing technology, parallel threading approaches, fast binary-search algorithms, or a combination of these and other hardware and software solutions that facilitate the real-time operations.

In some implementations, fracture matching technology can directly present information about fractures planes associated with three-dimensional microseismic events. The fracture planes presented can represent fracture networks that exhibit multiple orientations and activate complex fracture patterns. In some cases, hydraulic fracture parameters are extracted from a cloud of microseismic event data; such parameters may include, for example, fracture orientation trends, fracture density and fracture complexity. The fracture parameter information can be presented to field engineers or operators, for example, in a tabular, numerical, or graphical interface or an interface that combines tabular, numerical, and graphical elements. The graphical interface can be presented in real time and can exhibit the real-time dynamics of hydraulic fractures. In some instances, this can help field engineers analyze the fracture complexity, the fracture network and reservoir geometry, or it can help them better understand the hydraulic fracturing process as it progresses.

In some cases, fracture matching is performed based on a weighted least squares distance algorithm. For example, a fracture plane can be computed based on a weighted sum $S=\Sigma_{i=1}^{N} w_i h_i^2$. Here, N represents the number of microseismic data points, $w_i$ represents the weighting factor for the $i^{th}$ microseismic event, and $h_i$ represents the distance of the $i^{th}$ microseismic event from the fracture plane. A weighting factor that decreases (e.g., linearly, or nonlinearly) with the distance $h_i$ can be used, or another weighting factor can be used. The fracture plane can be identified by minimizing S with respect to the fracture plane parameters. In some instances, since S is a non-linear function of the plane's parameters. There may be none, a unique, or multiple solutions of the plane's parameters that minimize S. In some cases, it can be shown that there exist always at least one solution, and most of the times multiple solutions. In some cases, some of these solutions may represent a local minimum for S. One or more solutions may represent a global minimum of S. To solve the above optimization, an iterative algorithm may be needed. Different initial conditions for the iterative algorithm can lead to different solutions, and only a small set of initial conditions may lead to the global minimum of S. Several techniques can be used to find good initial conditions which lead to an appropriate or relevant solution of the plane's parameters. For example, one approach is based on the natural (partial Hough transforms) histogram for the planes parameters, and using the most feasible orientations as the initial conditions. Another approach includes viewing the microseismic events data set as a cloud in a three dimensional space, and determining the three principle axes of the data set in the space (for example, by calculating 6 entries for the symmetric moment of inertia tensor, and finding its eigen values and eigen vectors). The plane that is normal to the vector corresponding to the smallest eigen value can be regarded as a good initial condition. Additional or different techniques can be used to identify a good initial condition.

In some implementations, the weighted least squares distance algorithm can create a fracture plane for any set of initial conditions. For example, in some instances, initial fracture plane parameters can be computed from any non-collinear triplet in the microseismic data set, and the weighted least squares distance algorithm will produce a valid fracture plane regardless of which triplet is used. In many instances, the fracture plane's parameters produced based on the least squares distance algorithm can be close to optimal. In some implementations, the weighted least squares distance algorithm is not limited by the size of the microseismic data set. For example, in some instances, the complexity of the algorithm does not depend on the number of microseismic events being processed.

Although this application describes examples involving microseismic event data, the techniques and systems described in this application can be applied to other types of data. For example, the techniques and systems described here can be used to process data sets that include data elements that are unrelated to microseismic events, which may include other types of physical data associated with a subterranean zone. In some aspects, this application provides a framework for processing large volumes of data, and the framework can be adapted for various applications that are not specifically described here. For example, the techniques and systems described here can be used to analyze spatial coordinates, orientation data, or other types of information collected from any source. As an example, soil or rock samples can be collected (e.g., during drilling), and the concentration of a given compound (e.g., a certain "salt") as function of location can be identified. This may help geophysicists and operators evaluate the geo-layers in the ground.

FIG. 1A shows a schematic diagram of an example well system 100 with a computing subsystem 110. The example well system 100 includes a treatment well 102 and an observation well 104. The observation well 104 can be located remotely from the treatment well 102, near the treatment well 102, or at any suitable location. The well system 100 can include one or more additional treatment wells, observation wells, or other types of wells. The computing subsystem 110 can include one or more computing devices or systems located at the treatment well 102, at the observation well 104, or in other locations. The computing subsystem 110 or any of its components can be located apart from the other components shown in FIG. 1A. For example, the computing subsystem 110 can be located at a data processing center, a computing facility, or another suitable location. The well system 100 can include additional or different features, and the features of the well system can be arranged as shown in FIG. 1A or in any other suitable configuration.

The example treatment well 102 includes a well bore 101 in a subterranean zone 121 beneath the surface 106. The subterranean zone 121 can include one or less than one rock formation, or the subterranean zone 121 can include more than one rock formation. In the example shown in FIG. 1A, the subterranean zone 121 includes various subsurface layers 122. The subsurface layers 122 can be defined by geological or other properties of the subterranean zone 121. For example, each of the subsurface layers 122 can correspond to a particular lithology, a particular fluid content, a particular stress or pressure profile, or any other suitable characteristic. In some instances, one or more of the subsurface layers 122 can be a fluid reservoir that contains hydrocarbons or other types of fluids. The subterranean zone 121 may include any suitable rock formation. For example, one or more of the subsurface layers 122 can include sandstone, carbonate materials, shale, coal, mudstone, granite, or other materials.

The example treatment well 102 includes an injection treatment subsystem 120, which includes instrument trucks 116, pump trucks 114, and other equipment. The injection treatment subsystem 120 can apply an injection treatment to the subterranean zone 121 through the well bore 101. The injection treatment can be a fracture treatment that fractures the subterranean zone 121. For example, the injection treatment may initiate, propagate, or open fractures in one or more of the subsurface layers 122. A fracture treatment may include a mini fracture test treatment, a regular or full fracture treatment, a follow-on fracture treatment, a re-fracture treatment, a final fracture treatment or another type of fracture treatment.

The fracture treatment can inject a treatment fluid into the subterranean zone 121 at any suitable fluid pressures and fluid flow rates. Fluids can be injected above, at or below a fracture initiation pressure, above at or below a fracture closure pressure, or at any suitable combination of these and other fluid pressures. The fracture initiation pressure for a formation is the minimum fluid injection pressure that can initiate or propagate artificial fractures in the formation. Application of a fracture treatment may or may not initiate or propagate artificial fractures in the formation. The fracture closure pressure for a formation is the minimum fluid injection pressure that can dilate existing fractures in the subterranean formation. Application of a fracture treatment may or may not dilate natural or artificial fractures in the formation.

A fracture treatment can be applied by any appropriate system, using any suitable technique. The pump trucks 114 may include mobile vehicles, immobile installations, skids, hoses, tubes, fluid tanks or reservoirs, pumps, valves, or other suitable structures and equipment. In some cases, the pump trucks 114 are coupled to a working string disposed in the well bore 101. During operation, the pump trucks 114 can pump fluid through the working string and into the subterranean zone 121. The pumped fluid can include a pad, proppants, a flush fluid, additives, or other materials.

A fracture treatment can be applied at a single fluid injection location or at multiple fluid injection locations in a subterranean zone, and the fluid may be injected over a single time period or over multiple different time periods. In some instances, a fracture treatment can use multiple different fluid injection locations in a single well bore, multiple fluid injection locations in multiple different well bores, or any suitable combination. Moreover, the fracture treatment can inject fluid through any suitable type of well bore, such as, for example, vertical well bores, slant well bores, horizontal well bores, curved well bores, or any suitable combination of these and others.

A fracture treatment can be controlled by any appropriate system, using any suitable technique. The instrument trucks 116 can include mobile vehicles, immobile installations, or other suitable structures. The instrument trucks 116 can include an injection control system that monitors and controls the fracture treatment applied by the injection treatment subsystem 120. In some implementations, the injection control system can communicate with other equipment to monitor and control the injection treatment. For example, the instrument trucks 116 may communicate with the pump truck 114, subsurface instruments, and monitoring equipment.

The fracture treatment, as well as other activities and natural phenomena, can generate microseismic events in the subterranean zone 121, and microseismic data can be collected from the subterranean zone 121. For example, the microseismic data can be collected by one or more sensors 112 associated with the observation well 104, or the microseismic data can be collected by other types of systems. The microseismic information detected in the well system 100 can include acoustic signals generated by natural phenomena, acoustic signals associated with a fracture treatment applied through the treatment well 102, or other types of signals. For example, the sensors 112 may detect acoustic signals generated by rock slips, rock movements, rock fractures or other events in the subterranean zone 121. In some instances, the locations of individual microseismic events can be determined based on the microseismic data.

Microseismic events in the subterranean zone 121 may occur, for example, along or near induced hydraulic fractures. The microseismic events may be associated with pre-existing natural fractures or hydraulic fracture planes induced by fracturing activities. In some environments, the majority of detectable microseismic events are associated with shear-slip rock fracturing. Such events may or may not correspond to induced tensile hydraulic fractures that have significant width generation. The orientation of a fracture can be influenced by the stress regime, the presence of fracture systems that were generated at various times in the past (e.g., under the same or a different stress orientation). In some environments, older fractures can be cemented shut over geologic time, and remain as planes of weakness in the rocks in the subsurface.

The observation well 104 shown in FIG. 1A includes a well bore 111 in a subterranean region beneath the surface 106. The observation well 104 includes sensors 112 and other equipment that can be used to detect microseismic information. The sensors 112 may include geophones or other types of listening equipment. The sensors 112 can be located at a variety of positions in the well system 100. In FIG. 1A, sensors 112 are installed at the surface 106 and beneath the surface 106 in the well bore 111. Additionally or alternatively, sensors may be positioned in other locations above or below the surface 106, in other locations within the well bore 111, or within another well bore. The observation well 104 may include additional equipment (e.g., working string, packers, casing, or other equipment) not shown in FIG. 1A. In some implementations, microseismic data are detected by sensors installed in the treatment well 102 or at the surface 106, without use of an observation well.

In some cases, all or part of the computing subsystem 110 can be contained in a technical command center at the well site, in a real-time operations center at a remote location, in another appropriate location, or any suitable combination of these. The well system 100 and the computing subsystem 110 can include or access any suitable communication infrastructure. For example, well system 100 can include multiple separate communication links or a network of interconnected communication links. The communication links can include wired or wireless communications systems. For example, sensors 112 may communicate with the instrument trucks 116 or the computing subsystem 110 through wired or wireless links or networks, or the instrument trucks 116 may communicate with the computing subsystem 110 through wired or wireless links or networks. The communication links can include a public data network, a private data network, satellite links, dedicated communication channels, telecommunication links, or any suitable combination of these and other communication links.

The computing subsystem 110 can analyze microseismic data collected in the well system 100. For example, the computing subsystem 110 may analyze microseismic event data from a fracture treatment of a subterranean zone 121. Microseismic data from a fracture treatment can include data collected before, during, or after fluid injection. The computing subsystem 110 can receive the microseismic data at any suitable time. In some instances, the computing subsystem 110 receives the microseismic data in real time (or substantially in real time) during the fracture treatment. For example, the microseismic data may be sent to the computing subsystem 110 immediately upon detection by the sensors 112. In some instances, the computing subsystem 110 receives some or all of the microseismic data after the fracture treatment has been completed. The computing subsystem 110 can receive the microseismic data in any suitable format. For example, the computing subsystem 110 can receive the microseismic data in a format produced by microseismic sensors or detectors, or the computing subsystem 110 can receive the microseismic data after the microseismic data has been formatted, packaged, or otherwise processed. The computing subsystem 110 can receive the microseismic data by any suitable means. For example, the computing subsystem 110 can receive the microseismic data by a wired or wireless communication link, by a wired or wireless network, or by one or more disks or other tangible media.

The computing subsystem 110 can be used to identify a fracture plane from the locations of microseismic events. For example, the fracture plane can be identified by calculating parameters of the fracture plane from the locations of the microseismic events. In some cases, the fracture plane parameters are calculated by fitting a plane to the locations of the microseismic events. For example, the fit can be generated by reducing or minimizing one or more cost functions. In some cases, the fracture plane parameters are calculated by solving a system of equations. The system of equations can be generated based on a weighted sum, where each term of the weighted sum includes a weighting factor. The weighting factor can decrease (e.g., linearly or nonlinearly) with the distance between one of the microseismic events and the fracture plane. The system of equations can be generated by setting the partial derivatives of the weighted sum with respect to each of the fracture plane parameters equal to zero. This process can allow for local extrema (minima or maxima) to present an admissible solution. The system of equations can be solved, for example, by an iterative technique or other types of techniques. For example, the equations can be solved by denoting $$r_i = ax_i + by_i + cz_i + d,$$

$$h_i^2 = r_i^2 / (a^2 + b^2 + c^2),$$

and $$W_i = w(h_i^2) + h_i^2 \frac{\partial w}{\partial h_i^2},$$

and constructing three equations of the type:

$$\Sigma W_i r_i [(a^2+b^2+c^2)R - r_i T] = 0.$$

For the three (R, T) couples: (x, a), (y, b), (z, c), the value of d can be fixed to a convenient value.

Some of the techniques and operations described herein may be implemented by a computing subsystem configured to provide the functionality described. In various embodiments, a computing device may include any of various types of devices, including, but not limited to, personal computer systems, desktop computers, laptops, notebooks, mainframe computer systems, handheld computers, workstations, tablets, application servers, storage devices, or any type of computing or electronic device.

Figure 1B:
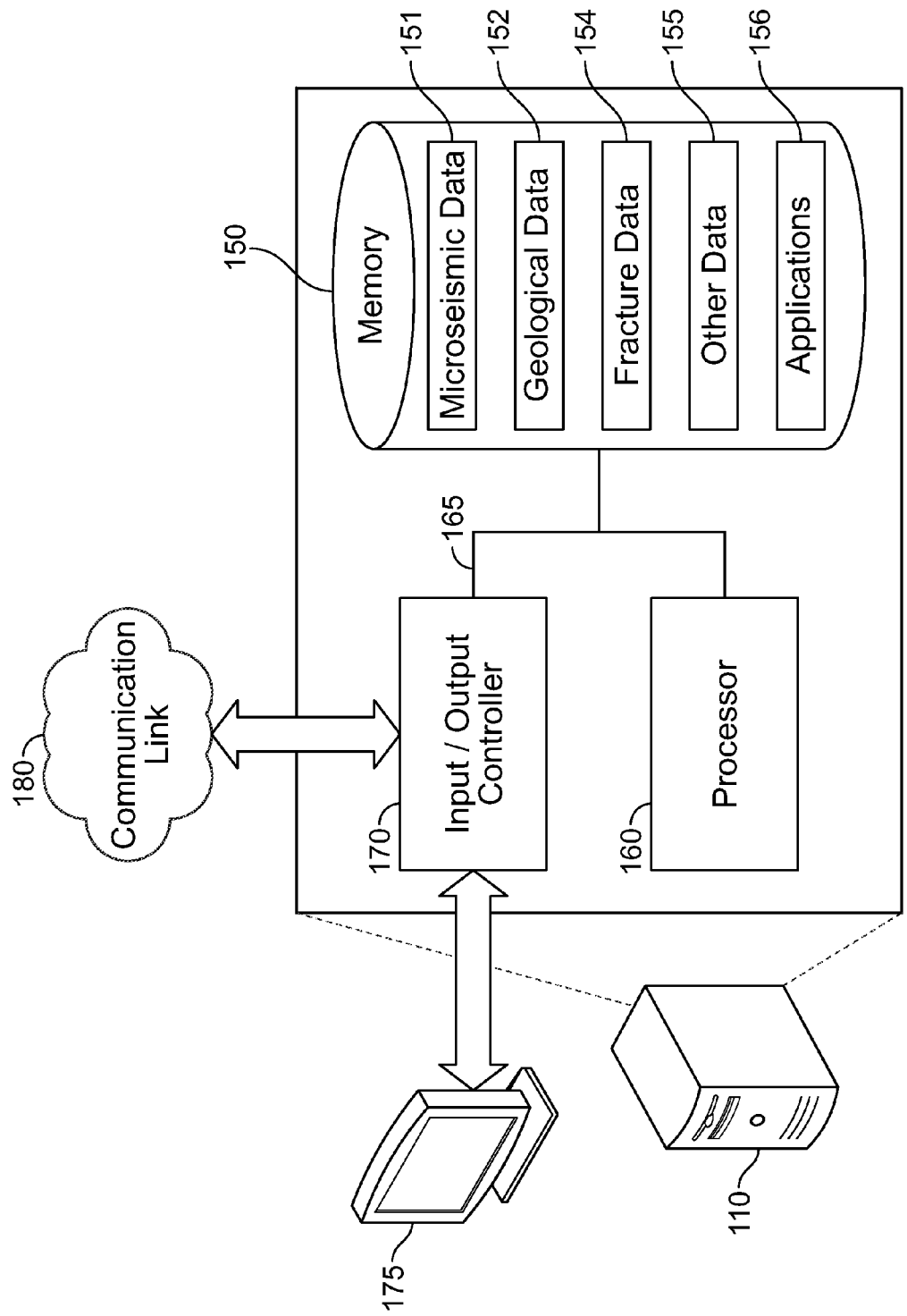
FIG. 1B is a diagram of the example computing subsystem 110 of FIG. 1A.

FIG. 1B is a diagram of the example computing subsystem 110 of FIG. 1A. The example computing subsystem 110 can be located at or near one or more wells of the well system 100 or at a remote location. All or part of the computing subsystem 110 may operate independent of the well system 100 or independent of any of the other components shown in FIG. 1A. The example computing subsystem 110 includes a processor 160, a memory 150, and input/output controllers 170 communicably coupled by a bus 165. The memory can include, for example, a random access memory (RAM), a storage device (e.g., a writable read-only memory (ROM) or others), a hard disk, or another type of storage medium. The computing subsystem 110 can be preprogrammed or it can be programmed (and reprogrammed) by loading a program from another source (e.g., from a CD-ROM, from another computer device through a data network, or in another manner). The input/output controller 170 is coupled to input/output devices (e.g., a monitor 175, a mouse, a keyboard, or other input/output devices) and to a communication link 180. The input/output devices receive and transmit data in analog or digital form over communication links such as a serial link, a wireless link (e.g., infrared, radio frequency, or others), a parallel link, or another type of link.

The communication link 180 can include any type of communication channel, connector, data communication network, or other link. For example, the communication link 180 can include a wireless or a wired network, a Local Area Network (LAN), a Wide Area Network (WAN), a private network, a public network (such as the Internet), a WiFi network, a network that includes a satellite link, or another type of data communication network.

The memory 150 can store instructions (e.g., computer code) associated with an operating system, computer applications, and other resources. The memory 150 can also store application data and data objects that can be interpreted by one or more applications or virtual machines running on the computing subsystem 110. As shown in FIG. 1B, the example memory 150 includes microseismic data 151, geological data 152, fracture data 153, other data 155, and applications 156. In some implementations, a memory of a computing device includes additional or different information.

The microseismic data 151 can include information on the locations of microseisms in a subterranean zone. For example, the microseismic data can include information based on acoustic data detected at the observation well 104, at the surface 106, at the treatment well 102, or at other locations. The microseismic data 151 can include information collected by sensors 112. In some cases, the microseismic data 151 has been combined with other data, reformatted, or otherwise processed. The microseismic event data may include any suitable information relating to microseismic events (locations, magnitudes, uncertainties, times, etc.). The microseismic event data can include data collected from one or more fracture treatments, which may include data collected before, during, or after a fluid injection.

The geological data 152 can include information on the geological properties of the subterranean zone 121. For example, the geological data 152 may include information on the subsurface layers 122, information on the well bores 101, 111, or information on other attributes of the subterranean zone 121. In some cases, the geological data 152 includes information on the lithology, fluid content, stress profile, pressure profile, spatial extent, or other attributes of one or more rock formations in the subterranean zone. The geological data 152 can include information collected from well logs, rock samples, outcroppings, microseismic imaging, or other data sources.

The fracture data 153 can include information on fracture planes in a subterranean zone. The fracture data 153 may identify the locations, sizes, shapes, and other properties of fractures in a model of a subterranean zone. The fracture data 153 can include information on natural fractures, hydraulic fractures, or any induced fractures, or any other type of discontinuity or failures in the subterranean zone 121. The fracture data 153 can include fracture planes calculated from the microseismic data 151. For each fracture plane, the fracture data 153 can include information (e.g., strike angle, dip angle, etc.) identifying an orientation of the fracture, information identifying a shape (e.g., curvature, aperture, etc.) of the fracture, information identifying boundaries of the fracture, or any other suitable information.

The applications 156 can include software applications, scripts, programs, functions, executables, or other modules that are interpreted or executed by the processor 160. Such applications may include machine-readable instructions for performing one or more of the operations represented in FIG.

4. The applications 156 may include machine-readable instructions for generating a user interface or a plot, such as, for example, those represented in FIG. 2A, 2B, 3A, or 3B. The applications 156 can obtain input data, such as microseismic data, geological data, or other types of input data, from the memory 150, from another local source, or from one or more remote sources (e.g., via the communication link 180). The applications 156 can generate output data and store the output data in the memory 150, in another local medium, or in one or more remote devices (e.g., by sending the output data via the communication link 180).

The processor 160 can execute instructions, for example, to generate output data based on data inputs. For example, the processor 160 can run the applications 156 by executing or interpreting the software, scripts, programs, functions, executables, or other modules contained in the applications 156. The processor 160 may perform one or more of the operations represented in FIG. 4 or generate one or more of the interfaces or plots shown in FIG. 2A, 2B, 3A, or 3B. The input data received by the processor 160 or the output data generated by the processor 160 can include any of the microseismic data 151, the geological data 152, the fracture data 153, or the other data 155.

FIGS. 2A and 2B are plots showing an example fracture plane 210 identified from microseismic data. FIG. 2A is a plot 200a showing a perspective view of the fracture plane 210 and nine microseismic events 206a, 206b, 206c, 206d, 206e, 206f, 206g, 206h, and 206i. FIG. 2B is a plot 200b showing a side view of the fracture plane 210 and the same nine microseismic events 206a, 206b, 206c, 206d, 206e, 206f, 206g, 206h, and 206i. The fracture plane 210 can be generated from the microseismic events, for example, using the process 400 shown in FIG. 4 or using another process. Nine microseismic events are shown; a fracture plane can be computed from a different number of events (e.g., hundreds of events, thousands of events, etc.).

As shown in FIG. 2A, the example fracture plane 210 is a rectangular, two-dimensional area extending through three-dimensional space. A fracture plane can have another shape (e.g., triangular, ellipsoidal, polygonal, irregular, etc.). In some cases, a fracture plane can be a three-dimensional volume, for example, to represent the width, aperture, or other features of a fracture.

The parameters of the fracture plane can be defined in any suitable coordinate system. For example, a fracture plane can be defined by the parameters a, b, c, and d of the equation 0=ax+by+cz+d that defines a plane in the xyz-coordinate system. A plane in the three-dimensional space may have other formulations, such as in a cylindrical coordinate system, in a spherical coordinate system, in a parameterized coordinate system, etc., where each formulation carriers with it four parameters of a plane. In some instances, the boundaries of the fracture plane or the extend of the fracture plane can be defined by a k vertices polygon, and thus by additional 2k parameters (e.g., by four microseismic events located on the plane, each with two coordinates, totally 8 parameters), or other information. For example, a boundary of the fracture plane can be defined by a polygon connecting the outermost microseismic events projected onto the fracture plane. In some cases, boundaries of the fracture plane are not defined. For example, the fracture plane may be considered as having infinite extent. In some implementations, a fracture plane can be defined by orientation parameters. For example, a fracture plane can be defined by a strike angle and a dip angle.

As shown in FIG. 2B, the location of each microseismic event is a specified distance from the fracture plane 210. For example, the microseismic event 206c is a distance 220c from the fracture plane 210, the microseismic event 206d is a distance 220d from the fracture plane 210, the microseismic event 206g is a distance 220g from the fracture plane 210, etc. In some cases, one or more microseismic events lies on the fracture plane.

The location of a microseismic event can be defined by spatial coordinates. The coordinates can be included, for example, in microseismic data from a fracture treatment. In some instances, the coordinates are derived from microseismic signals detected from a subterranean zone. In some examples, the location of the $i^{th}$ microseismic event can be represented by the coordinates $(x_i, y_i, z_i)$, where $x_i$ represents the x coordinate of the $i^{th}$ microseismic event, $y_i$ represents the y coordinate of the $i^{th}$ microseismic event, $z_i$ represents the z coordinate of the $i^{th}$ microseismic event. For a fracture plane defined in an xyz-coordinate system by parameters a, b, c, and d, the distance between the $i^{th}$ microseismic event and the fracture plane can be represented as $$h_i = \frac{ax_i + by_i + cz_i + d}{\sqrt{a^2 + b^2 + c^2}}.$$

In some cases, some formulations of a plane in a three-dimensional space can have four parameters, and the distance from the plane can involve a numerator over a denominator, where the denominator is a non-linear expression in the plane's parameters, and the numerator is a linear function of the microseismic events parameters. Additional or different formulation for a general plane and a distance to the plane in a three dimensional space can be used.

Figure 3A:
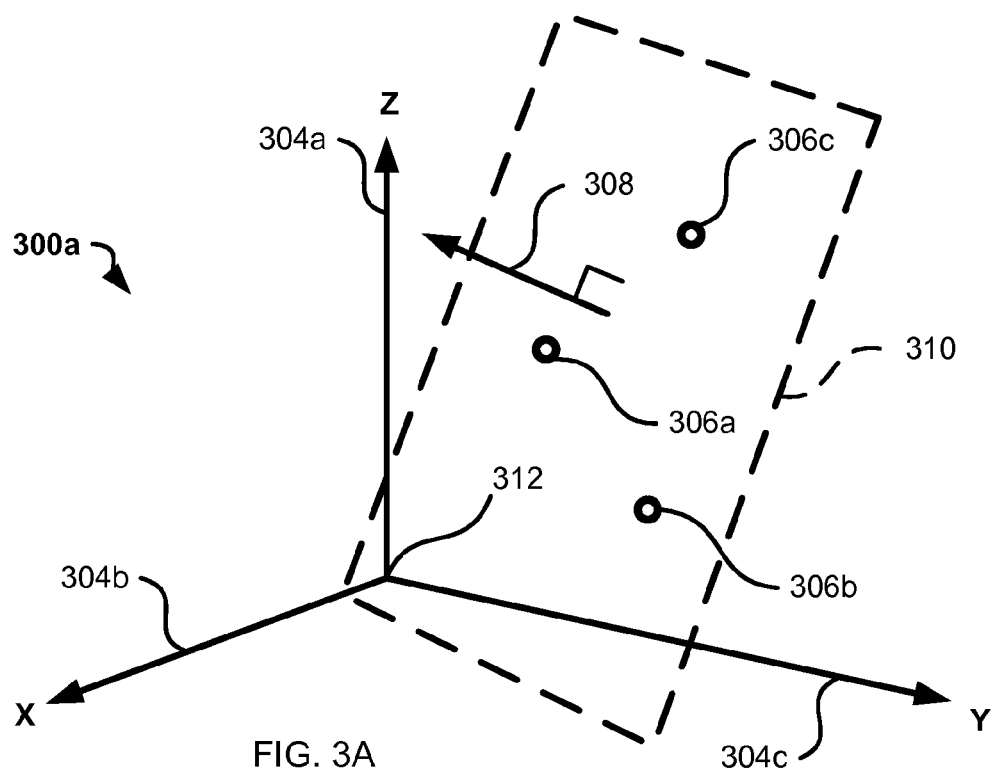
FIGS. 3A and 3B are plots showing an example fracture plane orientation.
Figure 3B:
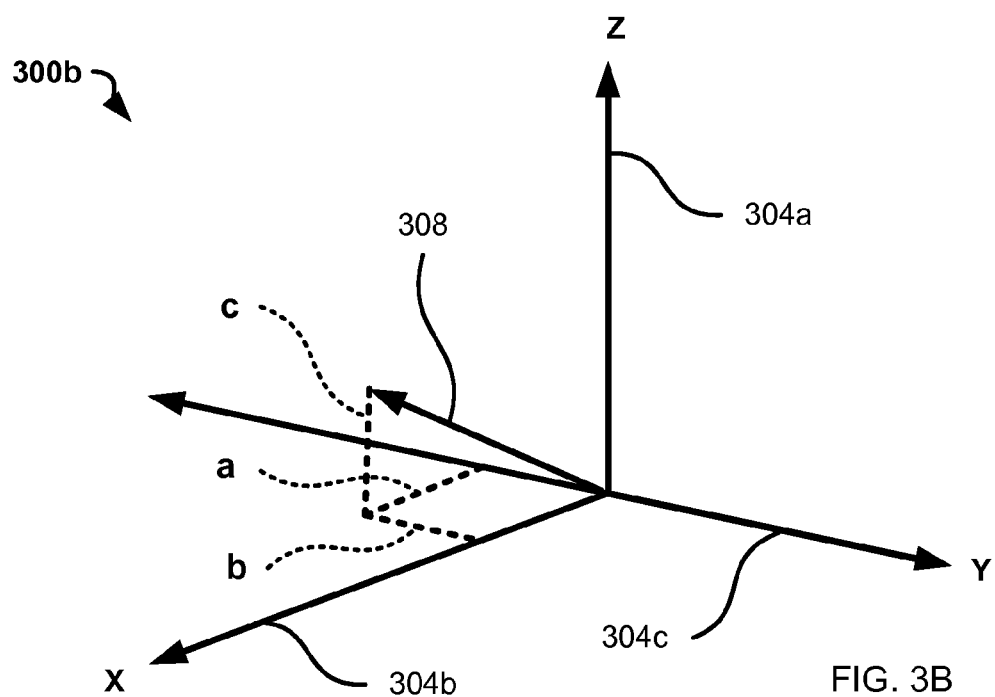

FIGS. 3A and 3B are plots showing an example fracture plane orientation. FIG. 3A shows a plot 300a of an example basic plane 310 defined by three non-collinear microseismic events 306a, 306b, and 306c. FIG. 3B shows a plot 300b of the normal vector 308 for the basic plane 310 shown in FIG. 3A. In FIGS. 3A and 3B, the vertical axis 304a represents the z-coordinate, the horizontal axis 304b represents the x-coordinate, and the horizontal axis 304c represents the y-coordinate. The plots 300a and 300b show a rectilinear coordinate system; other types of coordinate systems (e.g., spherical, elliptical, etc.) can be used.

As shown in FIG. 3A, the basic plane 310 is a two-dimensional surface that extends through the three-dimensional xyz-coordinate system. The normal vector 308 indicates the orientation of the basic plane 310. A normal vector can be a unit vector (a vector having unit length) or a normal vector can have non-unit length.

As shown FIG. 3B, the normal vector 308 has vector components (a, b, c). The vector components (a, b, c) can be computed, for example, based on the positions of the microseismic events 306a, 306b, and 306c, based on the parameters of the basic plane 310, or based on other information. In the plot 300b, the x-component of the normal vector 308 is represented as the length a along the x-axis, the y-component of the normal vector 308 is represented as the length b along the y-axis, and the z-component of the normal vector 308 is represented as the length c along the z-axis. (In the example shown, the y-component b is a negative value.)

The orientation of the basic plane 310 can be computed from the normal vector 308, the microseismic events themselves, parameters of the basic plane 310, other data, or any combination of these. For example, the dip $\theta$ and the strike $\phi$ of the basic plane 310 can be computed from the normal vector 308 based on the equations $$\theta = \arctan \frac{\sqrt{a^2 + b^2}}{c}, \quad (1)$$

$$\varphi = \arctan \frac{b}{a}.$$

The dip angle $\theta$ of a fracture plane can represent the angle between the fracture plane and the horizontal plane (e.g., the xy-plane). The strike angle $\phi$ of a fracture plane can represent the angle between a horizontal reference axis (e.g., the x-axis) and a horizontal line where the fracture plane intersects the horizontal plane. For example, the strike angle can be defined with respect to North or another horizontal reference direction. A fracture plane can be defined by other parameters, including angular parameters other than the strike angle and dip angle.

In some cases, the orientation of one or more basic planes can be used as input for generating histogram data. For example, a histogram of the basic plane orientations can be generated from a set of basic planes. In some cases, the histogram data is generated by assigning each basic plane to a bin based on the basic plane's orientation ($\theta$, $\phi$) and computing the quantity of basic planes associated with each bin. In some cases, the histogram is plotted, or the histogram data can be used or processed without displaying the histogram.

In some cases, the parameters of one or more basic planes can be used as initial conditions for solving a system of equations. For example, the orientation of a basic plane can be used as the initial conditions identified at 406 in the process 400 shown in FIG. 4. In some cases, the parameters of a basic plane are used as initial conditions for finding a fracture plane. The resulting fracture plane is not necessarily associated with the basic plane, or any of events of the basic plane.

Figure 4:
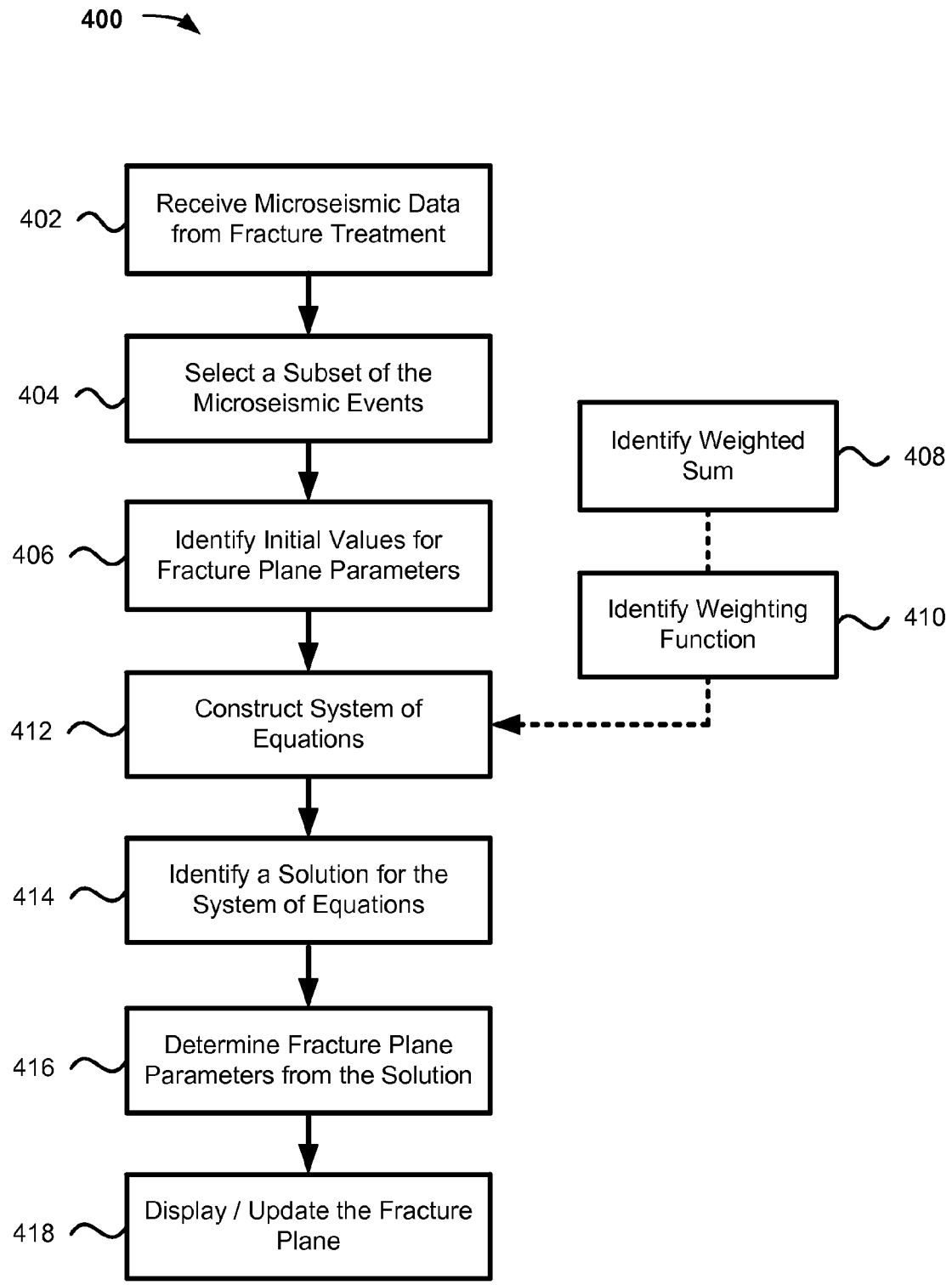
FIG. 4 is a flow chart of an example technique for identifying fracture planes from microseismic data.

FIG. 4 is a flow chart of an example process 400 for identifying fracture planes from microseismic data. Some or all of the operations in the process 400 can be implemented by one or more computing devices. In some implementations, the process 400 may include additional, fewer, or different operations performed in the same or a different order. Moreover, one or more of the individual operations or subsets of the operations in the process 400 can be performed in isolation or in other contexts. Output data generated by the process 400, including output generated by intermediate operations, can include stored, displayed, printed, transmitted, communicated or processed information.

In some implementations, some or all of the operations in the process 400 are executed in real time during a fracture treatment. An operation can be performed in real time, for example, by performing the operation in response to receiving data (e.g., from a sensor or monitoring system) without substantial delay. An operation can be performed in real time, for example, by performing the operation while monitoring for additional microseismic data from the fracture treatment. Some real time operations can receive an input and produce an output during a fracture treatment; in some instances, the output is made available to a user within a time frame that allows the user to respond to the output, for example, by modifying the fracture treatment.

In some cases, some or all of the operations in the process 400 are executed dynamically during a fracture treatment. An operation can be executed dynamically, for example, by iteratively or repeatedly performing the operation based on additional inputs, for example, as the inputs are made available. In some instances, dynamic operations are performed in response to receiving data for a new microseismic event (or in response to receiving data for a certain number of new microseismic events, etc.). In some implementations, some or all of the operations can be performed in real time. For example, the calculations or operations can be executed at the same time stream as or a better time stream than the event stream. For instance, an operation can be executed once a new event comes into an input buffer. In some instances, up-to-date analyzed information can be presented to a user in real time, for example, whenever the user requests. In some implementations, some or all of the operations may have a certain amount of delay (e.g., at most a delay of one event, or a delay of a different maximum duration).

The example process 400 can be used to identify fracture plane parameter based on microseismic event data. For example, the fracture plane parameters can be the parameters a, b, c, and d in the equation 0=ax+by+cz+d that defines a plane in the xyz-coordinate system. Additional or different fracture plane parameters can be identified. In some cases, the process 400 is used to identify fracture plane parameters in another coordinate system (e.g., in a spherical coordinate system, etc.). In some cases, the process 400 is used to identify fracture plane parameters that include the strike and dip angle of a fracture plane.

At 402, microseismic data from a fracture treatment are received. For example, the microseismic data can be received from memory, from a remote device, or another source. The microseismic event data may include information on the measured locations of multiple microseismic events, information on a measured magnitude of each microseismic event, information on an uncertainty associated with each microseismic event, information on a time associated with each microseismic event, etc. The microseismic event data can include microseismic data collected at an observation well, at a treatment well, at the surface, or at other locations in a well system. Microseismic data from a fracture treatment can include data for microseismic events detected before, during, or after the fracture treatment is applied. For example, in some instances, microseismic monitoring begins before the fracture treatment is applied, ends after the fracture treatment is applied, or both.

At 404, a subset of the microseismic events are selected. The subset of microseismic events can be selected from the microseismic data, for example, based on selection criteria, data filtering, or other techniques. In some cases, the subset are selected based on a trend in the microseismic data. For example, the selected subset of microseismic events may define a cluster of basic plane orientations. Clusters of basic plane orientations can be identified, for example, by creating a histogram of the basic plane orientations defined by non-collinear triplets in the microseismic data. Clusters of basic plane orientations can be identified by generating histogram data or by other techniques. Example techniques for generating histogram data are described in U.S. Provisional Application No. 61/710,582, filed on Oct. 5, 2012.

In some implementations, the subset of microseismic events are selected based on previously-identified fracture planes. For example, in some instances, two or more previously-generated fracture planes are merged into a single fracture plane. Fracture planes can be merged, for example, where two fracture planes are close to each other (e.g., parallel or substantially parallel fracture planes within a threshold distance of each other), where two fracture planes intersect at a shallow angle (e.g., parallel or substantially parallel fracture planes that intersect each other). The plurality of microseismic events can be selected (at 404) by combining the sets of microseismic events associated with the previously-identified fracture planes. As another example, in some instances, a new microseismic event is added to a previously-generated fracture plane. One or more new microseismic event can be added to a previously-generated fracture plane, for example, when a new microseismic event is detected, when a microseismic event is disassociated from another fracture plane, or in other instances.

At 406, initial values for the fracture plane parameters are identified. The initial values can be, for example, the parameters of a previously-generated fracture plane, or other initial values can be used. In some instances, the initial values are identified based on the subset of microseismic events. For example, the initial values can be identified by selecting three (or more) non-collinear microseismic events in the subset and determining the orientation of a basic plane defined by the selected events. In some implementations, the initial values can be identified, for example, by generating a two dimensional natural histogram (e.g., in strike and dip angles); choosing a peak of the histogram that is closest to the current orientation of the fracture plane, and identifying the initial values based on the peak's corresponding orientation.

At 412, a system of equations is constructed. The system of equations can include four equations or another number of equations. The system of equations can include linear equations, non-linear equations, or a combination of linear and non-linear equations. In some cases, the system of equations includes an independent equation for each fracture plane parameter. For example, if a fracture plane is defined by four the parameters a, b, c, and d in the equation $0=ax+by+cz+d$ that defines a plane in the xyz-coordinate system, the system of equations can include four independent equations. In some cases, the system of equations includes additional supporting equations, for example, to incorporate physical constraints, constants, or other information.

In some implementations, some or all of the equations in the system of equations are constructed from a weighted sum. For example, the system of equations can be the set of equations $\{\partial S/\partial a=0, \partial S/\partial b=0, \partial S/\partial c=0, d=d_0\}$, where S represents the weighted sum, and a, b, c, and d are fracture plane parameters. In this example, $\partial S/\partial a$ represents the partial derivative of the weighted sum with respect to the fracture plane parameter a, $\partial s/\partial b$ represents the partial derivative of the weighted sum with respect to the fracture plane parameter b, $\partial S/\partial c$ represents the partial derivative of the weighted sum with respect to the fracture plane parameter c, and $d_0$ represents a constant value for the fracture plane parameter d. Also in this example system of equations, each partial derivative is equated to zero to find a solution that minimizes the variation of the weighted sum with respect to each fracture plane parameter. In some cases, three of the general equations for the parameters can be originated by the minimization requirement, and the fourth can be an algebraic relationship between the parameters. Other types of equations can be included in the system of equations. In some cases, one or more terms or values in the system of equations are computed based on the selected subset of microseismic events and the initial conditions. The above algorithm can capture both local and global minimums. In some instances, the better the quality of the initial conditions is, the higher the chances that the algorithm converges to an appropriate global minimum will be. Aforementioned techniques for selecting proper initial conditions can help secure the convergence to the global minimum. Additional or different technique can be used to locate the global minimum.

In the example shown in FIG. 4, a weighted sum is identified at 408, and a weighting function is identified at 410. The weighted sum, the weighting function, or both can be selected or otherwise identified based on user input, based on the microseismic events, or other information. In some cases, the weighted sum and the weighting function are defined by pre-set parameters. For example, the weighted sum and the weighting function can be identified without reference to user input or the microseismic data.

In some examples, the weighted sum is represented as $S=\Sigma_{i=1}^{N}w_i f(h_i)$. Here, N represents the number of microseismic data points in the subset selected at 404, $w_i$ represents the weighting factor for the $i^{th}$ term of the weighted sum, the $i^{th}$ term is the contribution of the $i^{th}$ event, $h_i$ represents the distance of the $i^{th}$ microseismic event from the fracture plane, and $f(h_i)$ is a function of the distance $h_i$. In some cases, the function $f(h_i)$, the weighting factor $w_i$, or both of them depend on the location of the microseismic event and on its uncertainty for a microseismic event. For example, the function $f(h_i)$ may depend on the location uncertainty for the $i^{th}$ microseismic event. In some examples, the weighted sum is represented as $S=\Sigma_{i=1}^{N}w_i f(h_{max})$. Here, $h_{max}$ represents the distance between the fracture plane and the microseismic event that is maximally separated from the fracture plane.

In some examples, the function $f$ takes the form of an absolute value, and the weighted sum is represented as $S=\Sigma_{i=1}^{N}w_i|h_i|$. In some instances, this set of equations is more non-linear than other least square representations for the weighted sum. As such, in some cases, other techniques (e.g., improper derivatives) may be used for optimization, more iterations may be needed, and a more rigid solution can be found, which may lead to more fracture planes with smaller supported basis.

In some implementations, multiple different weighted sums can be used in combination. For example, one of the weighted sums (e.g., $S=\Sigma_{i=1}^{N}w_i h_i^2$) can be used to provide an initial condition, while another weight sum (e.g., $S=\Sigma_{i=1}^{N}w_i|h_i|$) can be used to find a final solution. Other combinations can be used. For some formulations, it can be shown that there is always a solution.

The function $f$ in the weighted sum can be, for example, $f(h_i)=h_i^2$, $f(h_{max})=h_{max}^2$, or another function can be used. For a fracture plane defined in the xyz-coordinate system by parameters a, b, c, and d, the distance between the $i^{th}$ microseismic event and the fracture plane can be represented as $$h_i = \frac{ax_i + by_i + cz_i + d}{\sqrt{a^2 + b^2 + c^2}}.$$

Here, $x_i$ represents the x coordinate of the $i^{th}$ microseismic event, $y_i$ represents the y coordinate of the $i^{th}$ microseismic event, $z_i$ represents the z coordinate of the $i^{th}$ microseismic event. Other functions can be used in the weighted sum, and the distance $h_i$ can be calculated in another manner, for example, using parameters for another coordinate system.

The weighting factor for the $i^{th}$ term can be evaluated according to the weighting function identified at 410. For example, the weighting factor $w_i$ can be represented by the function $w_i=e^{-h_i^2\alpha}$, where usually $\alpha$ is a value between zero and one, and for example, it may depend on the function $f$. As another example, the weighting factor $w_i$ can be represented by the function $w_i=(1+h_i^2)^{-1}$. As another example, the weighting factor $w_i$ can be represented by a "witch" function $w_i=(\alpha+\beta h_i^2)^{-1}$, where $\alpha$ and $\beta$ are constant values, which may be manipulated or optimized in some instances. In all of these examples, the weighting factor decreases nonlinearly with the distance between the $i^{th}$ microseismic event and the fracture plane. For example, $w_i=e^{-h_i^2\alpha}$ decreases exponentially, and $(1+h_i^2)^{-1}$ decreases polynomially. Other weighting functions can be used to determine the weighting factor for each term. The weighting factor may decrease linearly or non-linearly at a specified rate. In some instances, the dimensions of α and β is one over length square. In an more general sense, α and β can themselves be function of $h_i^2$.

In some instances, for a given fracture plane, the average absolute value of the distance of the events from the plane, μ, and the standard deviation, σ, can be calculated. Then the representative for the size of the cluster around the plane can be defined as, for example, h=μ+k*σ, where k can be a constant, for example, k=1. In one example, the weighted factors can be defined as $w_i = e^{-(h_i/h)^2 \alpha}$, where α is a positive number usually between 0 and 1. Other options for the weighted factor can be used, for example, $w_i = (1+(h_i/h)^2 \alpha)^{-1}$ and $w_i = (\alpha+(h_i/h)^2 \beta)^{-1}$. During iterations, each time approximations for the plane's parameters are obtained, the value of h (thus the value of μ and σ) can be re-calculated and new values for the weighted coefficients can be computed.

In some instances, the weighting factor for the $i^{th}$ term of the weighted sum is $w_i = e^{-h_i^2 \alpha_i}$, and $\alpha_i$ is a value between zero and one. In some instances, the weighting factor for the $i^{th}$ term of the weighted sum is $w_i = (1+\alpha_i h_i^2)^{-1}$, and $\alpha_i$ is a predetermined constant value. In some instances, the weighting factor for the $i^{th}$ term of the weighted sum is $w_i = (\beta_i + \alpha_i h_i^2)^{-1}$, where $\alpha_i$ and $\beta_i$ are predetermined constant values.

Different weighting factors may give similar results. Some test cases suggest that, for some data sets, there is little difference in the performance of the algorithm for the different options of the weighting function $w(h_i^2)$. There may be a difference, for example, with one or a small number of extreme microseismic events. In some of the test cases, the results were almost identical for different weighting functions, which suggests strongly supported fracture planes.

At 414, a solution to the system of equations is identified. In some cases, an analytical solution can be found (e.g., by elimination techniques, inversion techniques, etc.). For a typical microseismic data set, an analytical solution is not available and the system of equations is solved numerically. Example numerical methods for solving a system of equations include Newton's numerical method, the Newton-Rafson method, the conjugate gradient method, and others. In some cases, a numerical solution for a system of equations is computed using iterative techniques. A different set of initial conditions can be used in each iteration. In some instances, the initial conditions for a given iteration are derived from an approximate solution produced by a prior iteration. In some instances, the initial conditions for each iteration are derived from a different group of microseismic events. For example, an algorithm may progress through initial conditions derived from each basic plane orientation in a specified orientation range. The system can be iterated, for example, until the solution converges (e.g., when the approximate solution does not change or changes minimally on successive iterations), until a specified number of iterations have completed, until a specified amount of time has passed, or until another terminating condition is reached. In some cases, the system of equations produces the same solution for any set of initial conditions. In other words, the solution to the system of equations can be the same or substantially the same regardless of which initial conditions are used.

At 416, fracture plane parameters are determined from the solution identified at 414. The fracture plane parameters can be, for example, one or more of the parameters a, b, c, and d in the equation 0=ax+by+cz+d that defines a plane in the xyz-coordinate system. Additional or different fracture plane parameters (e.g., parameters in a different coordinate system, strike angle, dip angle, etc.) can be identified. In some instances, boundaries or other parameters of the fracture plane are also computed. The fracture plane parameters can be identified, for example, based on a numerical solution of the system of equations. In some cases, the fracture plane parameters are identified from the output of a final iteration in an iterative method.

At 418, the fracture plane is displayed, or the fracture plane is updated, or both. The fracture plane can be displayed, for example, by displaying a graphical representation of the fracture plane, by displaying the parameters of the fracture plane, or by displaying a numerical representation of the fracture plane. Example techniques for presenting fracture planes are described in U.S. Provisional Application No. 61/710,582, filed on Oct. 5, 2012.

The fracture plane can be updated, for example, based on additional microseismic data, based on merging the fracture plane with another fracture plane, based on another numerical solution to the system of equations, based on further iterations, based on other initial conditions, or based on other information. Example techniques for updating fracture planes from microseismic data are described in U.S. Provisional Application No. 61/710,582, filed on Oct. 5, 2012. In some cases, the fracture planes are updated in real time, for example, in response to collecting microseismic data.

Some embodiments of subject matter and operations described in this specification can be implemented in digital electronic circuitry, or in computer software, firmware, or hardware, including the structures disclosed in this specification and their structural equivalents, or in combinations of one or more of them. Some embodiments of subject matter described in this specification can be implemented as one or more computer programs, i.e., one or more modules of computer program instructions, encoded on computer storage medium for execution by, or to control the operation of, data processing apparatus. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read only memory or a random access memory or both. A computer includes a processor for performing actions in accordance with instructions and one or more memory devices for storing instructions and data. A computer may also include, or be operatively coupled to receive data from or transfer data to, or both, one or more mass storage devices for storing data, e.g., magnetic, magneto optical disks, or optical disks. However, a computer need not have such devices. Devices suitable for storing computer program instructions and data include all forms of non-volatile memory, media and memory devices, including by way of example semiconductor memory devices (e.g., EPROM, EEPROM, flash memory devices, and others), magnetic disks (e.g., internal hard disks, removable disks, and others), magneto optical disks, and CD ROM and DVD-ROM disks. The processor and the memory can be supplemented by, or incorporated in, special purpose logic circuitry.

To provide for interaction with a user, operations can be implemented on a computer having a display device (e.g., a monitor, or another type of display device) for displaying information to the user and a keyboard and a pointing device (e.g., a mouse, a trackball, a tablet, a touch sensitive screen, or another type of pointing device) by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A client and server are generally remote from each other and typically interact through a communication network. Examples of communication networks include a local area network ("LAN") and a wide area network ("WAN"), an inter-network (e.g., the Internet), a network comprising a satellite link, and peer-to-peer networks (e.g., ad hoc peer-to-peer networks). The relationship of client and server arises by virtue of computer programs running on the respective computers and having a client-server relationship to each other.

In some aspects, some or all of the features described here can be combined or implemented separately in one or more software programs for real-time automated fracture mapping. The software can be implemented as a computer program product, an installed application, a client-server application, an Internet application, or any other suitable type of software.

In some cases, a real-time automated fracture mapping program can dynamically show users spatial and temporal evolution of identified fracture planes in real-time as microseismic events gradually accumulate. The dynamics may include, for example, the generation of new fractures, the propagation and growth of existing fractures, or other dynamics. In some cases, a real-time automated fracture mapping program can provide users the ability to view the real-time identified fracture planes in multiple confidence levels. In some instances, users may observe spatial and temporal evolution of the high confidence level fractures, which may exhibit the dominant trends of overall microseismic event data. In some cases, a real-time automated fracture mapping program can evaluate fracture accuracy confidence, for example, to measure the certainty of identified fracture planes. The accuracy confidence values may, for example, help users better understand and analyze changes in a probability histogram or orientation distribution, which may continuously vary with the real-time accumulation of microseismic events. In some cases, a real-time automated fracture mapping program can provide results that are consistent with post data fracture mapping. For example, at the end of the hydraulic fracture treatment, the results produced by the real-time automated fracture mapping program can be statistically consistent with those obtained by a post data automated fracture mapping program operating on the same data. Such features may allow field engineers, operators and analysts, to dynamically visualize and monitor spatial and temporal evolution of hydraulic fractures, to analyze the fracture complexity and reservoir geometry, to evaluate the effectiveness of hydraulic fracturing treatment and to improve the well performance.

While this specification contains many details, these should not be construed as limitations on the scope of what may be claimed, but rather as descriptions of features specific to particular examples. Certain features that are described in this specification in the context of separate implementations can also be combined. Conversely, various features that are described in the context of a single implementation can also be implemented in multiple embodiments separately or in any suitable subcombination.

A number of embodiments have been described. Nevertheless, it will be understood that various modifications can be made. Accordingly, other embodiments are within the scope of the following claims.

The invention claimed is:

1. A computer-implemented method for analyzing microseismic data, the method comprising:
   receiving data representing locations of a plurality of microseismic events associated with a fracture treatment of a subterranean zone; and
   calculating, by data processing apparatus, a fracture plane parameter from the locations of the plurality of microseismic events, the fracture plane parameter calculated based on a sum of weighted terms, each of the weighted terms including a weighting factor that decreases with a distance between at least one of the microseismic events and a fracture plane defined by the fracture plane parameter.

2. The method of claim 1, wherein calculating the fracture plane parameter comprises minimizing a partial derivative of the weighted sum with respect to the fracture plane parameter.

3. The method of claim 1, wherein each of the weighted terms includes a weighting factor that decreases nonlinearly with a distance between at least one of the microseismic events and a fracture plane defined by the fracture plane parameter.

4. The method of claim 1, wherein calculating the fracture plane parameter comprises calculating at least one of the fracture plane parameters a, b, c, or d for the fracture plane defined by the equation 0=ax+by+cz+d, where x, y, and z represent the coordinates of a three-dimensional space.

5. The method of claim 4, wherein calculating the fracture plane parameter comprises:
 selecting initial values of the fracture plane parameters a, b, c, and d;
 constructing a system of equations {∂S/∂a=0, ∂S/∂b=0, ∂S/∂c=0}, and an algebraic equation that relates the parameters, wherein S represents the weighted sum; and
 using the initial values to solve the system of equations.

6. The method of claim 5, wherein the system of equations is a system of non-linear equations.

7. The method of claim 5, further comprising computing possible initial values based on a normal vector defined by three of the microseismic events.

8. The method of claim 1, further comprising selecting the plurality of microseismic events based on combining multiple sets of microseismic events associated with previously-identified fracture planes.

9. The method of claim 1, wherein the weighted sum $S=\Sigma_{i=1}^{N} w_i f(h_i)$, wherein N represents the number of microseismic data points, $w_i$ represents the weighting factor for the $i^{th}$ term of the weighted sum, $h_i$ represents the distance of the $i^{th}$ microseismic event from the fracture plane, and $f(h_i)$ is a function of the distance $h_i$.

10. The method of claim 9, wherein the function $f(h_i)=h_i^2$, the distance $$h_i = \frac{ax_i + by_i + cz_i + d}{\sqrt{a^2 + b^2 + c^2}},$$

$x_i$ represents the x coordinate of the $i^{th}$ microseismic event, $y_i$ represents the y coordinate of the $i^{th}$ microseismic event, $z_i$ represents the z coordinate of the $i^{th}$ microseismic event, and a, b, c, and d are the fracture plane parameters.

11. The method of claim 1, wherein the weighted sum $S=\Sigma_{i=1}^{N} w_i |h_i|$, wherein N represents the number of microseismic data points, $w_i$ represents the weighting factor for the $i^{th}$ term of the weighted sum, $h_i$ represents the distance of the $i^{th}$ microseismic event from the fracture plane, and $|h_i|$ represents the absolute value of the distance of the $i^{th}$ microseismic event from the fracture plane.

12. The method of claim 1, wherein calculating the fracture plane parameter from the locations of the plurality of microseismic events comprises calculating the fracture plane parameter from a location and uncertainty associated with each of the microseismic events.

13. A non-transitory computer-readable medium encoded with instructions that, when executed by data processing apparatus, perform operations comprising:
 receiving data representing locations of a plurality of microseismic events associated with a fracture treatment of a subterranean zone; and
 calculating a fracture plane parameter from the locations of the plurality of microseismic events, the fracture plane parameter calculated based on a sum of weighted terms, each of the weighted terms including a weighting factor that decreases with a distance between at least one of the microseismic events and a fracture plane defined by the fracture plane parameter.

14. The computer-readable medium of claim 13, wherein calculating the fracture plane parameter comprises minimizing a partial derivative of the weighted sum with respect to each fracture plane parameter.

15. The computer-readable medium of claim 13, wherein each of the weighted terms includes a weighting factor that decreases nonlinearly with a distance between at least one of the microseismic events and a fracture plane defined by the fracture plane parameter.

16. The computer-readable medium of claim 13, wherein calculating the fracture plane parameter comprises calculating at least one of the fracture plane parameters a, c, or d for the fracture plane defined by the equation 0=ax+by+cz+d, where x, y, and z represent the coordinates of a three-dimensional space.

17. The computer-readable medium of claim 13, wherein calculating the fracture plane parameter comprises:
 selecting an initial value of the fracture plane parameter;
 constructing coefficient factors and a system of equations based on the weighted sum; and
 using the initial value to solve the system of equations.

18. The computer-readable medium of claim 17, the operations further comprising computing the initial value based on a normal vector defined by three of the microseismic events.

19. The computer-readable medium of claim 13, the operations further comprising selecting the plurality of microseismic events based on combining multiple sets of microseismic events associated with previously-identified fracture planes.

20. The computer-readable medium of claim 13, wherein the weighted sum $S=\Sigma_{i=1}^{N} w_i h_i^2$, wherein N represents the number of microseismic data points, $w_i$ represents the weighting factor for the $i^{th}$ term of the weighted sum, $h_i$ and represents the distance of the $i^{th}$ microseismic event from the fracture plane.

21. The computer-readable medium of claim 20, wherein the weighting factor $w_i$ decreases nonlinearly with the distance $h_i$.

22. A system comprising:
 a computer-readable medium that stores data representing locations of a plurality of microseismic events associated with a fracture treatment of a subterranean zone; and
 data processing apparatus operable to calculate a fracture plane parameter from the locations of the plurality of microseismic events, the fracture plane parameter calculated based on a sum of weighted terms, each of the weighted terms including a weighting factor that decreases with a distance between at least one of the microseismic events and a fracture plane defined by the fracture plane parameter.

23. The system of claim 22, further comprising a display device operable to display a graphical representation of the fracture plane.

24. The system of claim 22, wherein each of the weighted terms includes a weighting factor that decreases nonlinearly with a distance between at least one of the microseismic events and a fracture plane defined by the fracture plane parameter.

25. The system of claim 22, wherein calculating the fracture plane parameter comprises calculating at least one of the fracture plane parameters a, b, c, or d for the fracture plane defined by the equation 0=ax+by+cz+d, where x, y, and z represent the coordinates of a three-dimensional space.

26. The system of claim 22, wherein calculating the fracture plane parameter comprises:
- selecting an initial value of the fracture plane parameter;
- constructing a system of equations based on the weighted sum; and
- using the initial values to solve the system of equations.

27. The system of claim 26, the operations further comprising computing the initial values based on a normal vector defined by a set of three of the microseismic events.

28. The system of claim 22, the operations further comprising selecting the plurality of microseismic events based on combining multiple sets of microseismic events associated with previously-identified fracture planes.

* * * * *